United States Patent
Bartram et al.

(10) Patent No.: US 8,223,034 B2
(45) Date of Patent: Jul. 17, 2012

(54) HORIZONTAL PIT MOUNT INTERFACE DEVICE

(75) Inventors: Stephen J. Bartram, Ocala, FL (US); Jorge I. Ortiz, Ocala, FL (US)

(73) Assignee: Eister AMCO Water, LLC, Ocala, FL (US)

(*) Notice: Subject to any disclaimer, the term of this patent is extended or adjusted under 35 U.S.C. 154(b) by 168 days.

(21) Appl. No.: 12/855,921

(22) Filed: Aug. 13, 2010

(65) Prior Publication Data

US 2011/0062298 A1 Mar. 17, 2011

Related U.S. Application Data

(60) Provisional application No. 61/241,708, filed on Sep. 11, 2009.

(51) Int. Cl.
*G08C 19/16* (2006.01)
(52) U.S. Cl. ............... 340/870.01; 340/870.02
(58) Field of Classification Search ............ 340/870.01, 340/870.02; 248/66, 74.1, 222.14, 200, 300, 248/220.21, 220.31; 24/458; 343/719; 439/277
See application file for complete search history.

(56) References Cited

U.S. PATENT DOCUMENTS

| | | |
|---|---|---|
| 1,781,280 A | 11/1930 | Haase et al. |
| 3,457,835 A | 7/1969 | Siebold |
| 4,463,354 A | 7/1984 | Sears |
| 5,298,894 A | 3/1994 | Cerny et al. |
| 5,416,475 A | 5/1995 | Tolbert et al. |
| 5,583,492 A | 12/1996 | Nakanishi et al. |
| 5,619,192 A | 4/1997 | Ayala |
| 5,654,701 A | 8/1997 | Liao et al. |
| 5,659,300 A | 8/1997 | Dresselhuys et al. |
| 5,703,601 A | 12/1997 | Nalbandian et al. |
| 5,747,701 A | 5/1998 | Marsh et al. |
| 5,777,222 A | 7/1998 | Roberts |
| 5,825,303 A | 10/1998 | Bloss, Jr. et al. |

(Continued)

FOREIGN PATENT DOCUMENTS

EP 0252184 A1 1/1988

(Continued)

OTHER PUBLICATIONS

"Water metering systems solutions—Measurement systems, reading systems, and project management", from www.elsteramcowater.com/en/downloads/WMSS.pdf.

(Continued)

*Primary Examiner* — Amy Sterling
*Assistant Examiner* — Erin W Smith
(74) *Attorney, Agent, or Firm* — Duane Morris LLP

(57) ABSTRACT

A mounting assembly for an automatic meter reading (AMR) unit includes a body having a head and an elongate stem extending from a bottom surface of the head. The elongate stem is sized and configured to be received in and extend through a hole formed in a cover of a pit, and the head has a size greater than a size of the hole formed in the cover of the pit. A nut defines a central aperture sized and configured to receive the elongate stem of the body, and a support channel has a pair of spaced apart arms each including a ledge configured to be received in a slot formed in the elongate stem of the body. The support channel defines an opening that is sized and configured to receive at least a portion of the AMR unit therein.

20 Claims, 9 Drawing Sheets

U.S. PATENT DOCUMENTS

| | | | |
|---|---|---|---|
| 5,877,703 | A | 3/1999 | Bloss, Jr. et al. |
| 5,918,618 | A | 7/1999 | Neupert |
| 5,970,791 | A | 10/1999 | Barczynski et al. |
| 6,166,692 | A | 12/2000 | Nalbandian et al. |
| 6,177,883 | B1 | 1/2001 | Jennetti et al. |
| 6,181,257 | B1 | 1/2001 | Meek et al. |
| 6,218,995 | B1 * | 4/2001 | Higgins et al. ............. 343/719 |
| 6,269,829 | B1 | 8/2001 | Chen et al. |
| 6,300,907 | B1 | 10/2001 | Lazar et al. |
| 6,369,769 | B1 | 4/2002 | Nap et al. |
| 6,378,817 | B1 | 4/2002 | Bublitz et al. |
| 6,424,270 | B1 | 7/2002 | Ali |
| 6,568,645 | B2 | 5/2003 | Maddox |
| 6,617,976 | B2 * | 9/2003 | Walden et al. ............ 340/870.02 |
| 6,657,552 | B2 | 12/2003 | Belski et al. |
| 6,708,571 | B1 | 3/2004 | Hopfe et al. |
| 6,819,292 | B2 | 11/2004 | Winter |
| 6,897,374 | B2 | 5/2005 | Garber et al. |
| 6,904,788 | B2 | 6/2005 | Sandford et al. |
| 6,933,857 | B2 | 8/2005 | Foote |
| 6,953,046 | B2 | 10/2005 | Chen et al. |
| 6,954,144 | B1 | 10/2005 | Kiser et al. |
| 6,954,178 | B2 | 10/2005 | Winter |
| 6,990,414 | B2 | 1/2006 | Belke et al. |
| 7,053,767 | B2 | 5/2006 | Petite et al. |
| 7,059,200 | B2 | 6/2006 | Sallee |
| 7,079,810 | B2 | 7/2006 | Petite et al. |
| 7,103,511 | B2 | 9/2006 | Petite |
| 7,126,551 | B2 | 10/2006 | Winter |
| 7,137,550 | B1 | 11/2006 | Petite |
| 7,171,852 | B2 | 2/2007 | Smich et al. |
| 7,202,828 | B2 | 4/2007 | Zehngut et al. |
| 7,209,840 | B2 | 4/2007 | Petite et al. |
| 7,228,726 | B2 | 6/2007 | Kates |
| 7,263,073 | B2 | 8/2007 | Petite et al. |
| 7,267,014 | B2 | 9/2007 | Winter |
| 7,277,027 | B2 | 10/2007 | Ehrke et al. |
| 7,283,063 | B2 | 10/2007 | Salser, Jr. |
| 7,290,456 | B2 | 11/2007 | Sallee |
| 7,295,128 | B2 | 11/2007 | Petite |
| 7,325,782 | B2 | 2/2008 | Gebler et al. |
| 7,346,463 | B2 | 3/2008 | Petite et al. |
| 7,353,966 | B2 | 4/2008 | McKinnon, Jr. |
| 7,365,687 | B2 | 4/2008 | Borleske et al. |
| 7,391,324 | B1 | 6/2008 | Pflugrath et al. |
| 7,397,907 | B2 | 7/2008 | Petite |
| 7,424,527 | B2 | 9/2008 | Petite |
| 7,446,672 | B2 * | 11/2008 | Johnson et al. .......... 340/870.02 |
| 7,480,501 | B2 | 1/2009 | Petite |
| 7,533,581 | B2 | 5/2009 | Sallee |
| 2003/0052790 | A1 | 3/2003 | Dunstan |
| 2006/0169868 | A1 | 8/2006 | Anderson et al. |
| 2006/0218104 | A1 | 9/2006 | Johnson et al. |
| 2006/0272830 | A1 | 12/2006 | Fima |
| 2008/0074283 | A1 * | 3/2008 | Verkleeren et al. ...... 340/870.02 |
| 2008/0238714 | A1 | 10/2008 | Ehrke et al. |
| 2008/0316050 | A1 * | 12/2008 | Showcatally ............. 340/870.02 |
| 2011/0119821 | A1 * | 5/2011 | Chen ................................ 4/295 |

FOREIGN PATENT DOCUMENTS

| | | |
|---|---|---|
| JP | 2002081972 A | 3/2002 |
| WO | 0139222 A3 | 3/2001 |
| WO | 2008039697 A1 | 4/2008 |

OTHER PUBLICATIONS

"100,000 gas meter network made a reality thanks to Wavenis Technology", from http://www.m2mpremier.com/UploadFiles/Coronis_CS_SmartMetering.pdf.

RPM Series Rotary Gas Meters with Continuous Mechanical Temperature Compensator, American Meter Company, 4 pages, published Mar. 2002.

Enoch, M., "AMR technology helps utility expand service, contain costs", Pipe Line & Gas Industry, Mar. 2000, pp. 97-99.

Elster Amco Profiles, "RVG G10-G25 A New Star in the Metering Program", 2002, vol. 1, 19 pages, from www.elster.com.

* cited by examiner

HORIZONTAL PIT MOUNT INTERFACE DEVICE

CROSS-REFERENCE TO RELATED APPLICATIONS

This application claims priority to U.S. Provisional Patent Application Ser. No. 61/241,708 filed on Sep. 11, 2009, the entirety of which is herein incorporated by reference.

FIELD OF DISCLOSURE

The disclosed system and methods relate to automated meter reading devices. More specifically, the disclosed system and methods relate to mounting automated reading devices in utility pits.

BACKGROUND

A longstanding problem in the utility industry is the economic reading of utility meters. The reading of such meter installations presents a number of problems, such as the inconvenience to the homeowner as well as the inconvenience to the meter reader when the homeowner is not present at the time of the individual meter reading.

In addition, manual meter reading has a significant disadvantage in that it requires a large amount of manpower, leading to significant expense. Further, meter readers may erroneously record the numeral values of the meter register or the homeowner may not be present at the time the meter reading is to take place. In order to solve the personnel requirements of physical meter reading, a large number of remote meter reading units have been developed. These meter reading units may be, for example, an automatic meter reading (AMR) unit. The meter register comprises a sensor to detect the rotation of movement of the components within the meter to generate an electrical count of the volume of commodity that flows through the meter. The recorded data from the meter is broadcast by a communication device of the AMR unit using an RF signal. In such types of systems, the meter measurement is broadcast from the communication device using an RF signal that can be read from a remote location. In these remote meter reading systems, the antenna of the communication device typically extends slightly above the pit lid such that the radio frequency signals generated by the antenna can be transmitted away from the meter pit. In many situations, the pit lid is formed from a metallic material, such as iron, that significantly inhibits the transmission of radio frequency signals therethrough.

Some meter pits are shallow and do not provide sufficient room to properly place AMR in their customary vertical arrangement. In these situations, the AMR device may be placed on the ground where it may be damaged. Additionally, the transmission of the signals from the meter may suffer as the AMR unit may located too deep within the pit resulting in the attenuation of the RF signal.

Accordingly, an improved pit mount interface (PMI) device is desirable.

SUMMARY

A mounting assembly for an automatic meter reading (AMR) unit is disclosed that includes a body having a head and an elongate stem extending from a bottom surface of the head. The elongate stem is sized and configured to be received in and extend through a hole formed in a cover of a pit, and the head has a size greater than a size of the hole formed in the cover of the pit. A nut defines a central aperture sized and configured to receive the elongate stem of the body, and a support channel has a pair of spaced apart arms each including a ledge configured to be received in a slot formed in the elongate stem of the body. The support channel defines an opening that is sized and configured to receive at least a portion of the AMR unit therein.

Also disclosed is a mounting assembly comprising a mounting body, a locking nut, and a support channel. The mounting body includes a head and an elongate stem extending from a bottom surface of the head. The elongate stem has an outer diameter that is less than an outer diameter of the head. The locking nut defines a central aperture sized and configured to receive the elongate stem of the body. The support channel includes a bottom wall, a pair of side walls extending from the bottom wall, a pair of top walls inwardly extending from the side walls, and a pair spaced apart arms extending from the top walls. Each of the spaced apart arms includes a ledge configured to be received in a slot defined by the elongate stem of the mounting body. The support channel defines an opening that is sized and configured to receive at least a portion of an AMR unit therein.

A method is also disclosed in which an elongate stem of a mounting body is inserted through a hole defined by a cover of a utility pit. The mounting body includes a head having a diameter that is greater than a diameter of the elongate stem. A locking nut is advanced along the elongate stem of the mounting body to secure the mounting body to the cover of the utility pit. A pair of arms of a support channel are compressed. The support channel includes a bottom wall, a pair of side walls extending from the bottom wall, a pair of top walls inwardly extending from the side walls, and the pair spaced apart arms which extend from the top walls. The pair of arms of the support channel are released such that at least one ledge extending from one of the pair of arms is received in a slot defined by the elongate stem of the mounting body.

The foregoing and other aspects will be apparent from the following description of the preferred embodiments. In the description, reference is made to the accompanying drawings which form a part hereof, and in which there is shown by way of illustration, and not limitation, a preferred embodiment. Such embodiment does not necessarily represent the full scope of the invention, and reference must therefore be made to the claims herein for interpreting the scope of the invention and its equivalents.

BRIEF DESCRIPTION OF THE DRAWINGS

These and other features and advantages of the present invention will be more fully disclosed in, or rendered obvious by the following detailed description of the preferred embodiments of the invention, which are to be considered together with the accompanying drawings wherein like numbers refer to like parts and further wherein.

DETAILED DESCRIPTION

Figure 1:
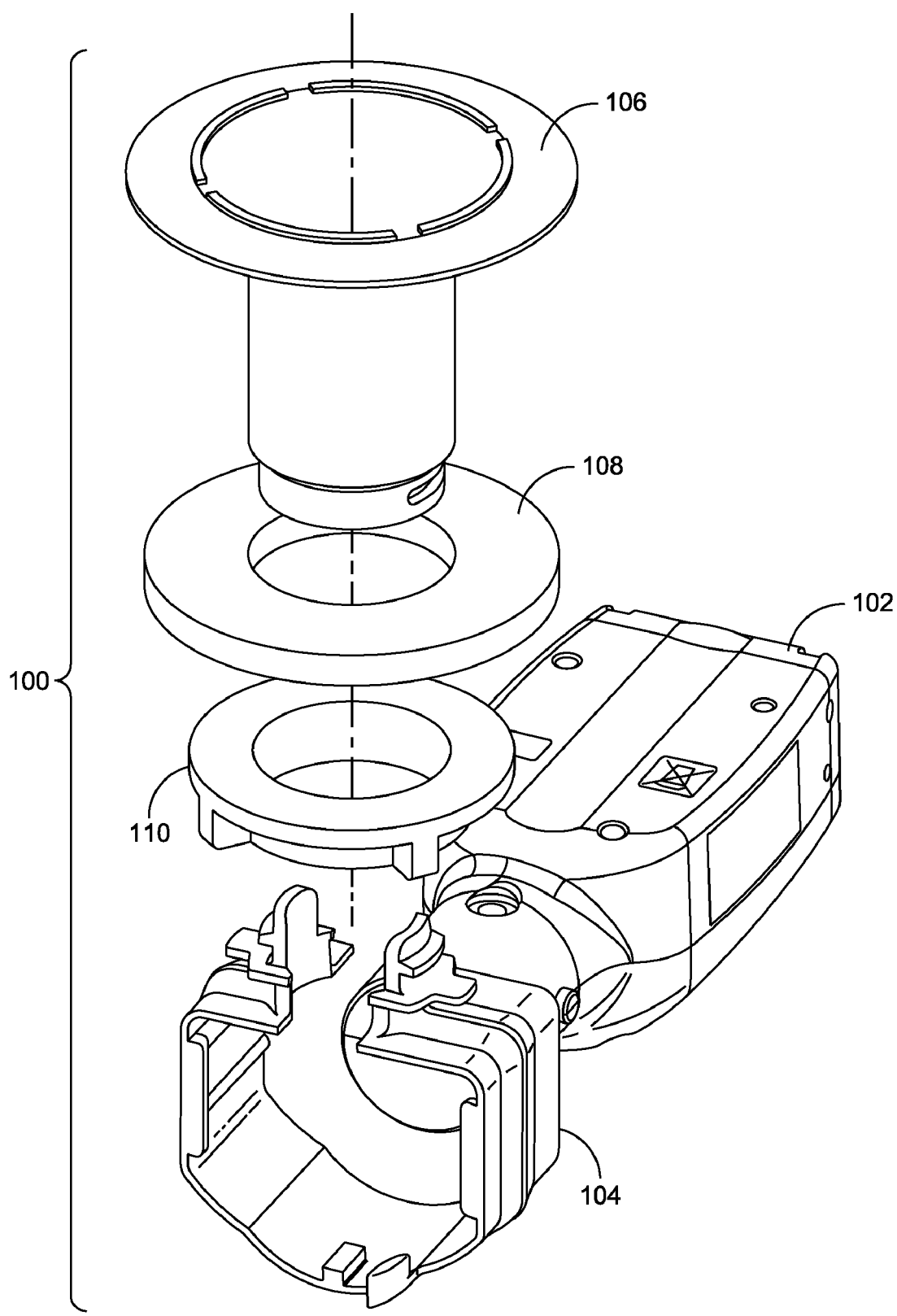
FIG. 1 is an exploded assembly view of one example of an improved horizontal pit mounting assembly.

This description of preferred embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

FIG. 1 illustrates an improved pit mount interface ("PMI") assembly 100 for coupling an automated meter reading (AMR) unit 102 to a pit cover. As shown in FIG. 1, the PMI assembly 100 includes a channel support 104 that couples to a mounting body 106. A washer or spacer 108 and a retaining nut 110 may be used to secure the mounting body 106 to the cover of a utility pit.

Figure 2:
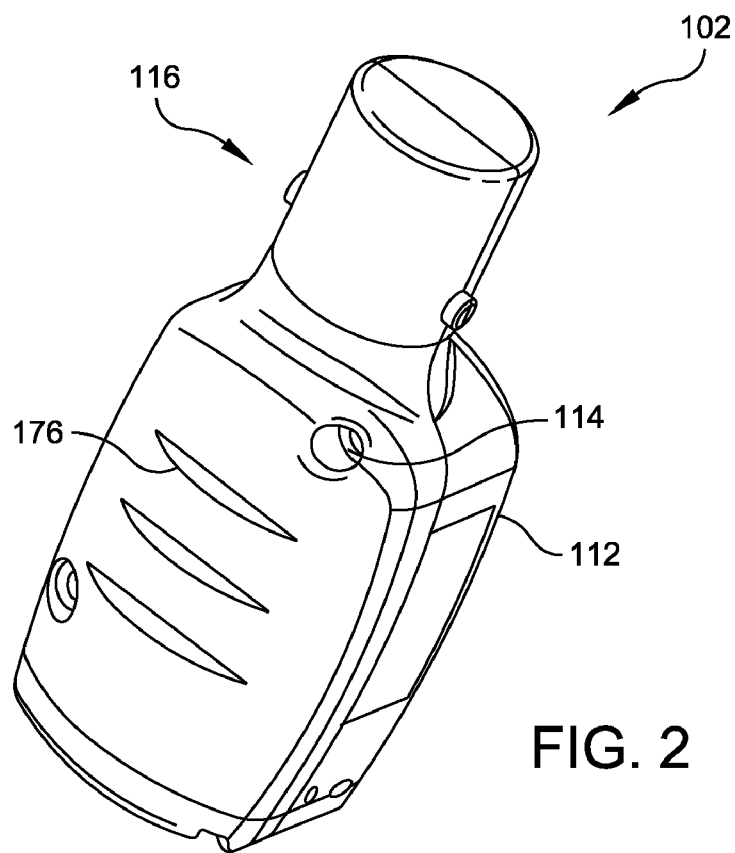
FIG. 2 is an isometric view of one example of an automatic meter reading unit in accordance with the horizontal pit mounting assembly illustrated in FIG. 1.
Figure 3:
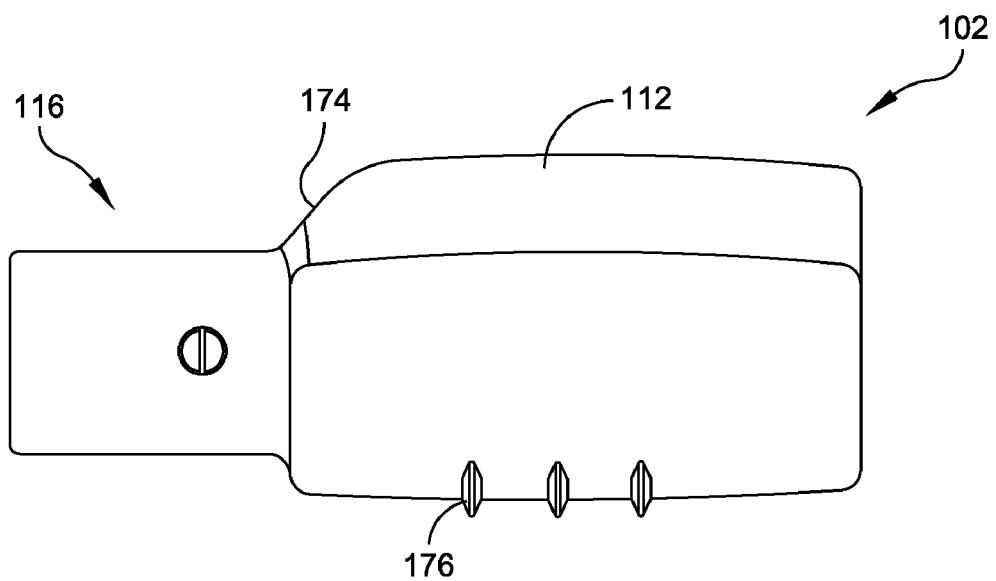
FIG. 3 is a side view of the automatic meter reading unit illustrated in FIG. 2.

In one embodiment, AMR unit 102 is an Evolution™ AMR unit available from Elster AMCO Water of Ocala, Fla. as illustrated in FIGS. 2 and 3. As best seen in FIG. 2, the body 112 of the AMR unit 102 may define a hole or depression 114 and include a neck portion 116, which may have a smaller cross-sectional area than the cross-sectional area of the remainder of the body 112. An antenna (not shown) may be disposed within the body 112 of the AMR unit 102.

Figure 4:
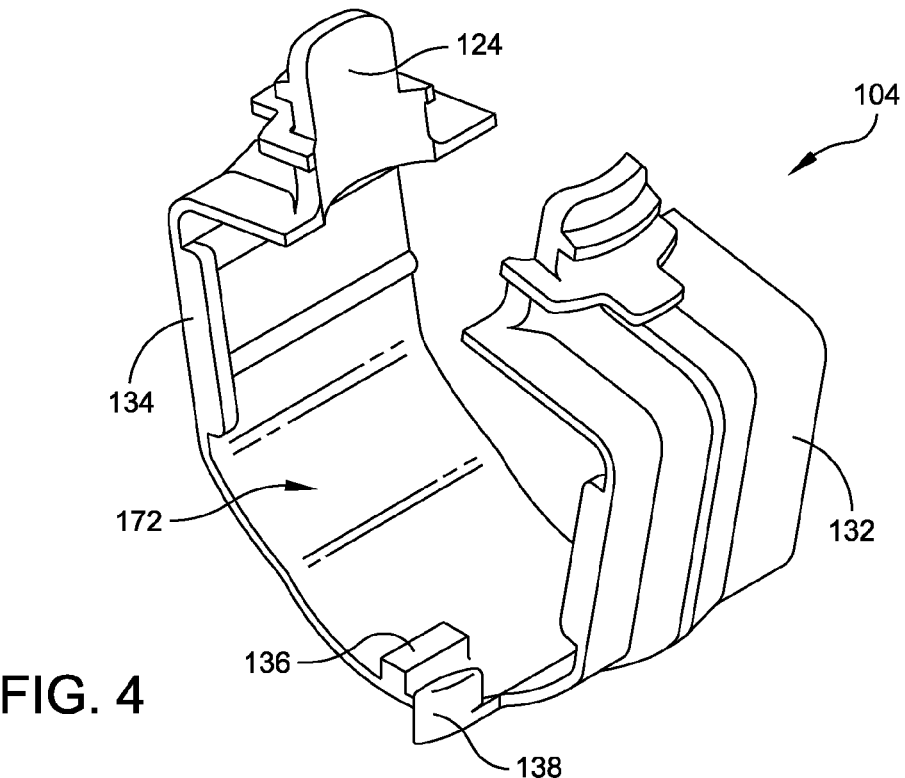
FIG. 4 is an isometric view of one example of a channel support in accordance with the improved horizontal pit mounting assembly illustrated in FIG. 1.
Figure 5:
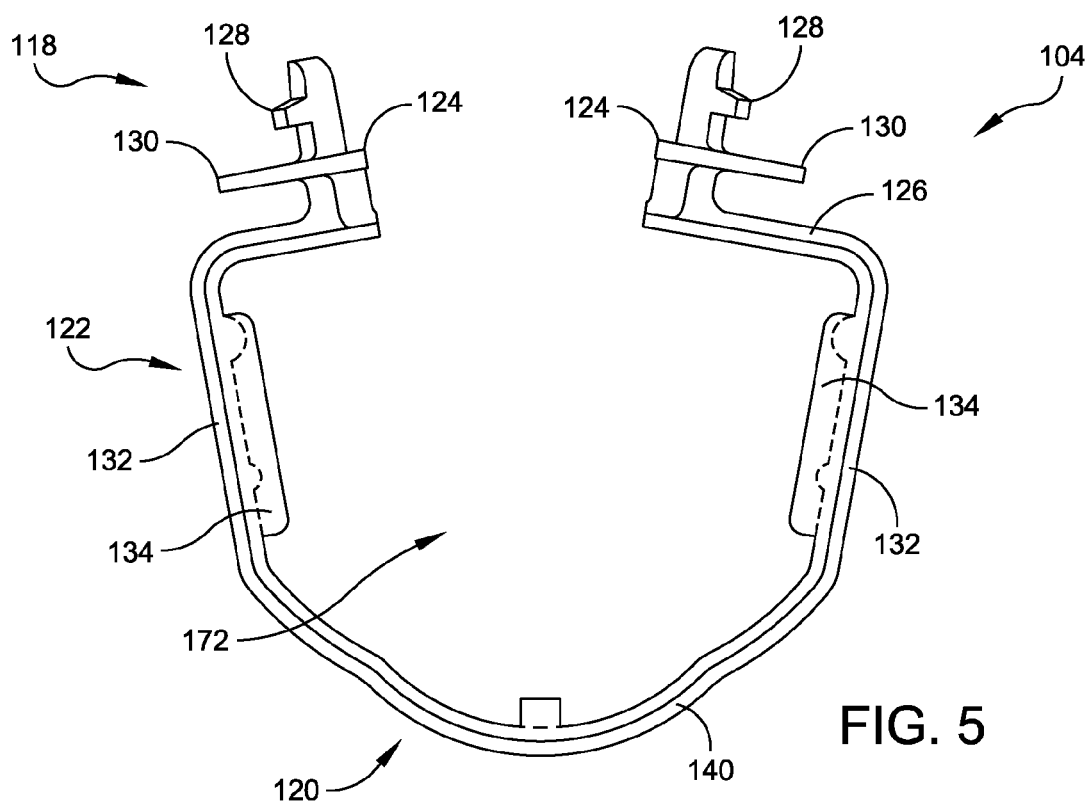
FIG. 5 is a front end plan view of the channel support illustrated in FIG. 4.
Figure 6:
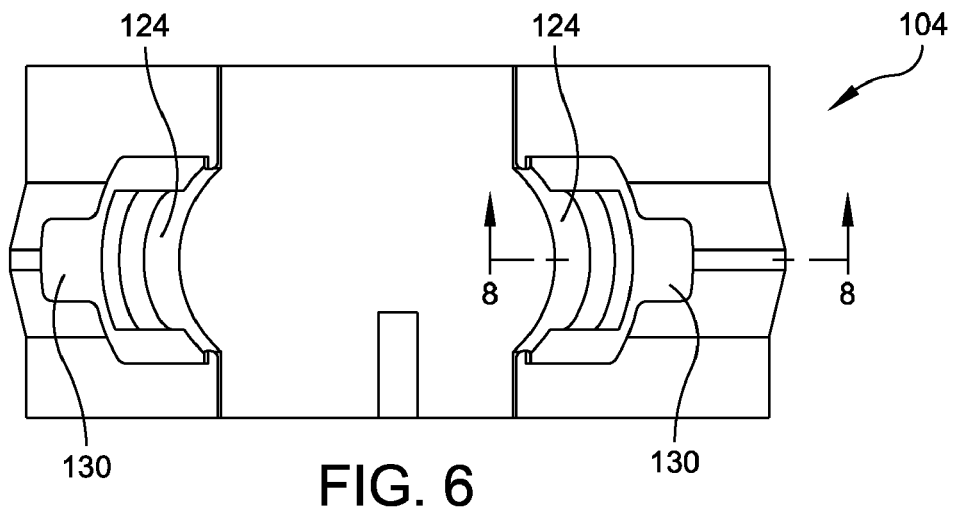
FIG. 6 is a top side plan view of the channel support illustrated in FIG. 4.
Figure 7:
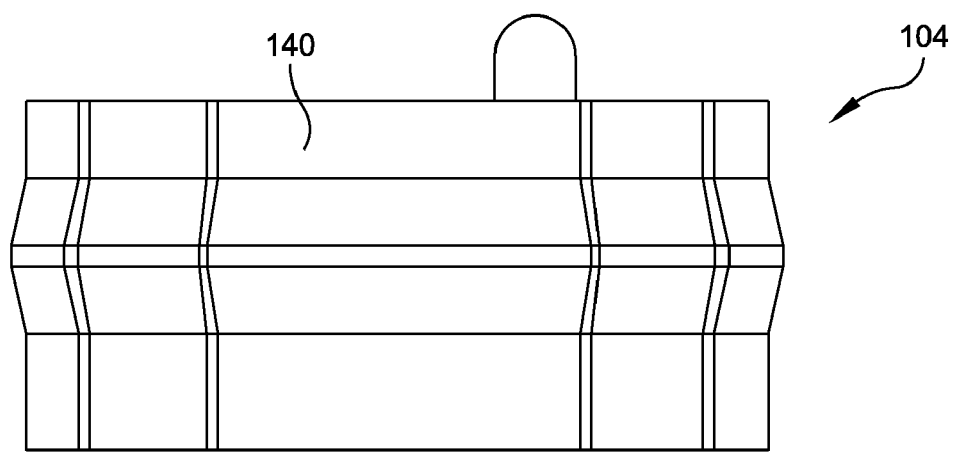
FIG. 7 is a bottom side plan view of the channel support illustrated in FIG. 4.
Figure 8:
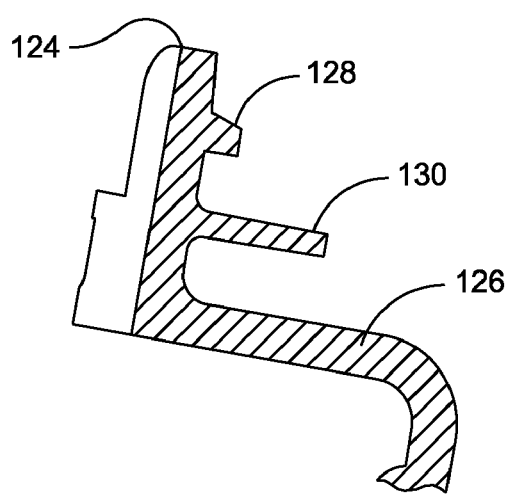
FIG. 8 is a section view of the channel support taken along line 8-8 in FIG. 6.
Figure 9:
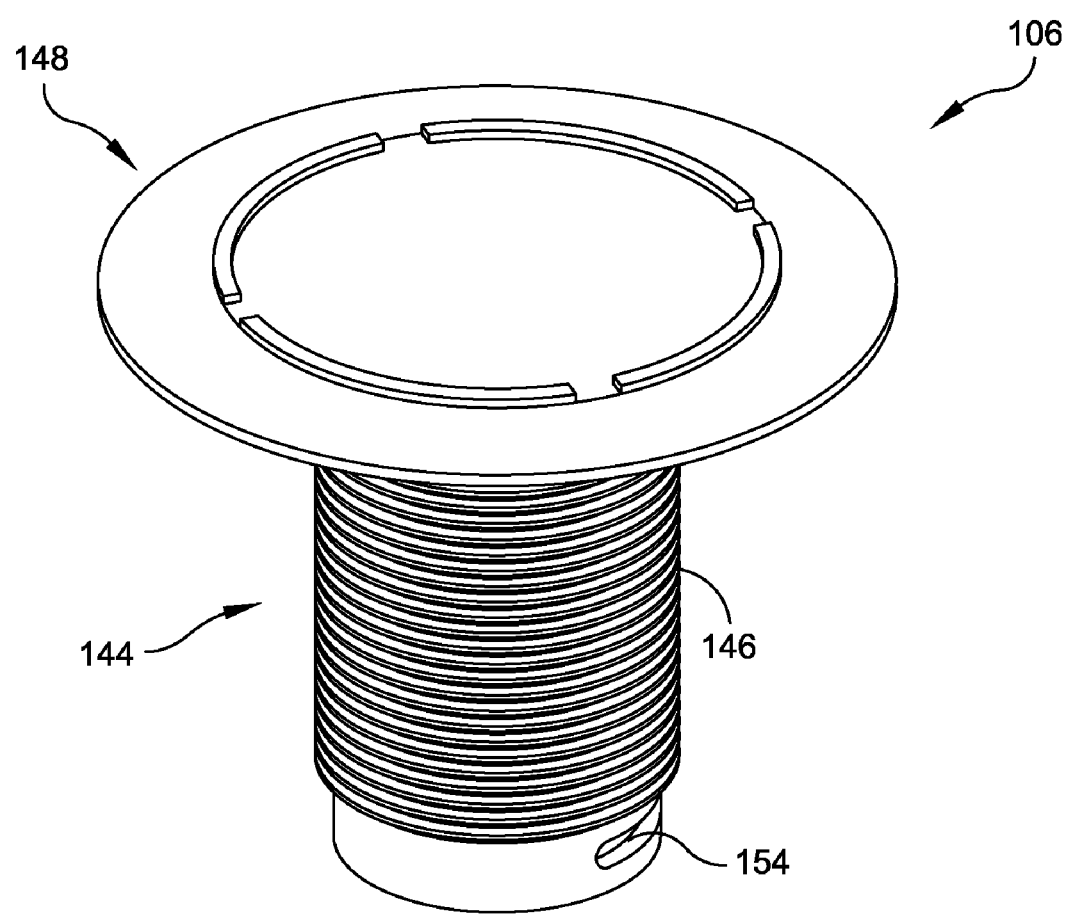
FIG. 9 is a side view of one example of a mounting body in accordance with the improved horizontal pit mounting assembly illustrated in FIG. 1.

Turning now to FIGS. 4-6, support channel 104 may be formed from a polymer or plastic material that is sturdy enough to support the weight of an AMR unit 102, but flexible and durable enough to reversibly bend. Support channel 104 includes a coupling portion 118, a bottom-support portion 120, and a middle portion 122 extending between the coupling portion 118 and the bottom-support portion 120. As shown in FIG. 5, the coupling portion 118 of the support channel includes a pair of spaced apart arms 124, each of which perpendicularly extend from a shelf or top wall 126. Each of the arms 124 includes a ledge 128 and a protrusion 130 that perpendicularly extend from the arms 124. The ledge 128 and protrusion 130 are vertically spaced from one another on each arm 124.

The middle portion 122 includes a pair of spaced apart side walls 132 each having a respective inwardly projecting flange 134. The bottom-support portion 120 includes a ridge 136 and a stop 138 that inwardly extend from the bottom wall or band 140 towards the open space 172 defined by the support channel 104. The bottom wall or band 140 may have a convex or outwardly bowed shape. In some embodiments, the stop 138 may have a circular cross-sectional area and be sized and configured to be received in the hole or recess 114 defined by AMR body 112.

Figure 10:
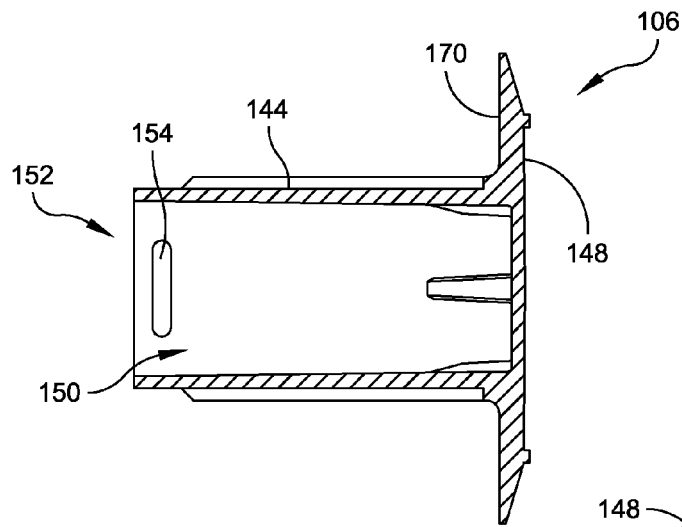
FIG. 10 is a sectional view taken along the central axis of the mounting body illustrated in FIG. 9.
Figure 11:
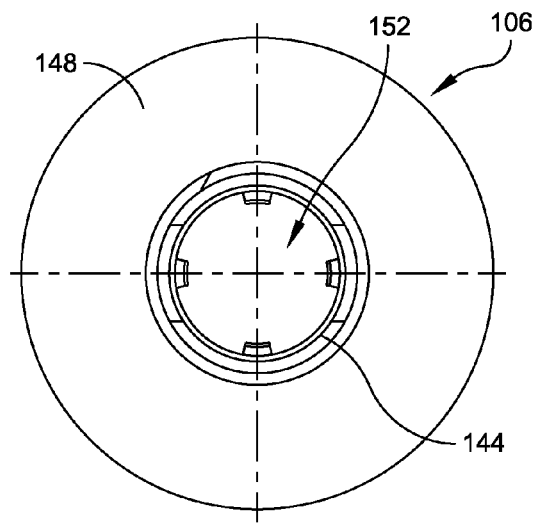
FIG. 11 is a bottom side plan view of the mounting body illustrated in FIG. 9.
Figure 12:
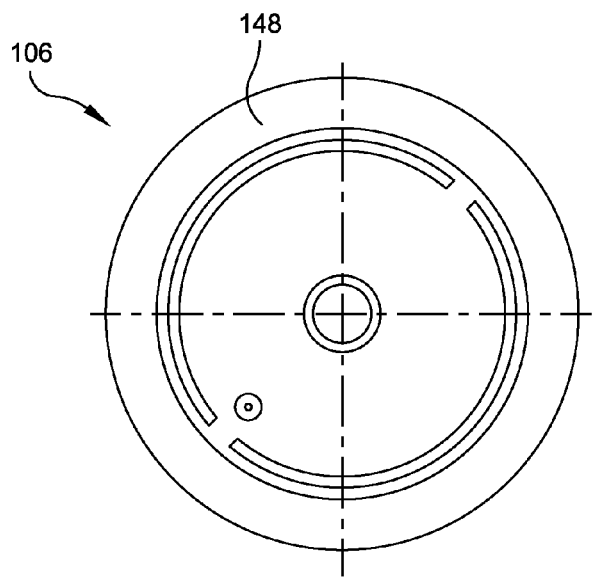
FIG. 12 is a top side plan view of the mounting body illustrated in FIG. 9.

Turning now to FIGS. 9-12, the mounting body 106 has an elongate cylindrical stem 144 extending from an enlarged head 148. The elongate stem 144 may included a plurality of threads 146 or other engagement features, such as annular grooves, disposed thereon. The enlarged head 148 has an outer diameter (or cross-sectional width) that is greater than the outer diameter (or cross-sectional width) of the elongate stem 144 and may have a convex shape. In some embodiments, the outer diameter of the head portion 148 is approximately 80 mm (approximately 3.15 inches), and the outer diameter of the stem portion 144 is approximately 38 mm (approximately 1.5 inches). As best seen in FIGS. 10 and 11, the mounting body 106 defines a central chamber 150 and an opening 152 having a diameter of approximately 30 mm (approximately 1.18 inches). The elongate stem 144 defines a pair of diametrically opposed slots 154 at its lower end, which are sized and configured to receive the ledges 128 that extend from the arms 124 of the support channel 104 therein. In some embodiments, the thickness of the enlarged head 148 is approximately 4 mm (approximately 0.16 inches), although one skilled in the art will appreciate that the head 148 of the mounting body 110 may have other widths. Preferably, the mounting body 106 is fabricated from a polymeric or plastic material.

Figure 13:
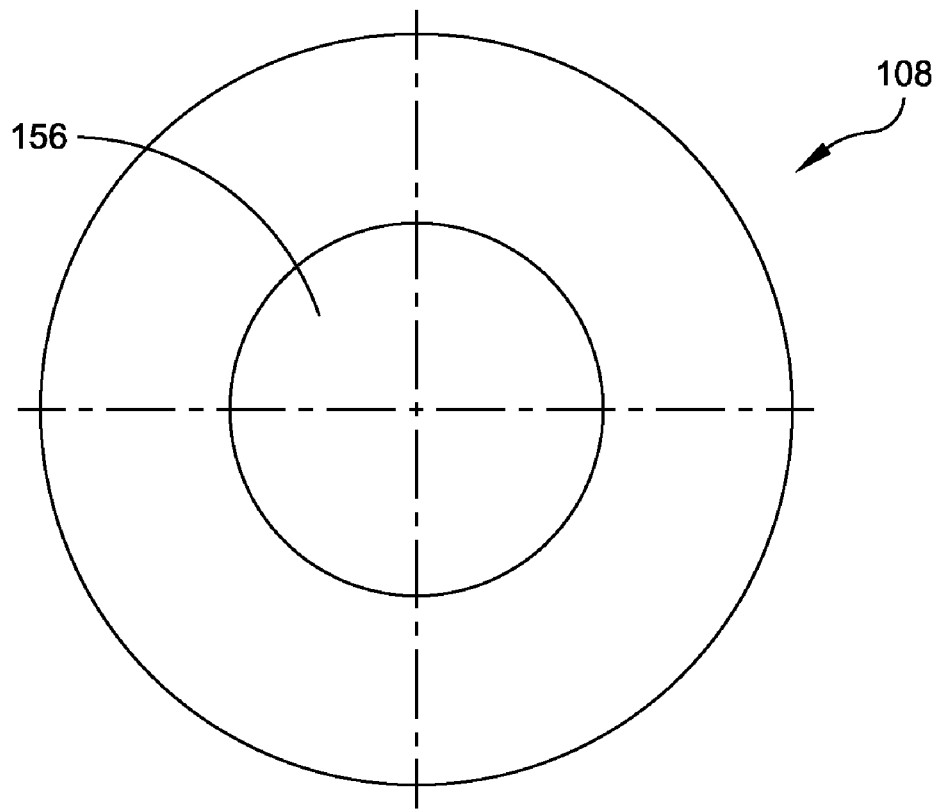
FIG. 13 is a top side plan view of one example of a spacer in accordance with the improved horizontal pit mounting assembly illustrated in FIG. 1.
Figure 14:
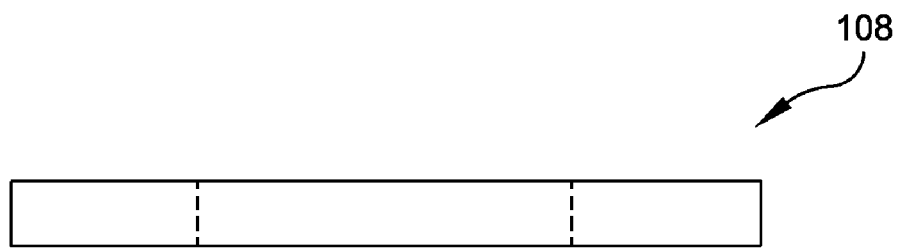
FIG. 14 is a side view of the spacer illustrated in FIG. 13.

As illustrated in FIGS. 13 and 14, washer or spacer 108 may also be formed from a polymer or plastic material. Spacer 106 may define a central aperture 156 having a diameter that is sufficiently large to receive the elongate stem 144 of the mounting body 106 therein. In some embodiments, the central aperture 156 has a diameter of approximately 38.2 mm (approximately 1.5 inches), although one skilled in the art will understand that central aperture 156 of spacer 108 may have other dimensions.

Figures 15, 16:
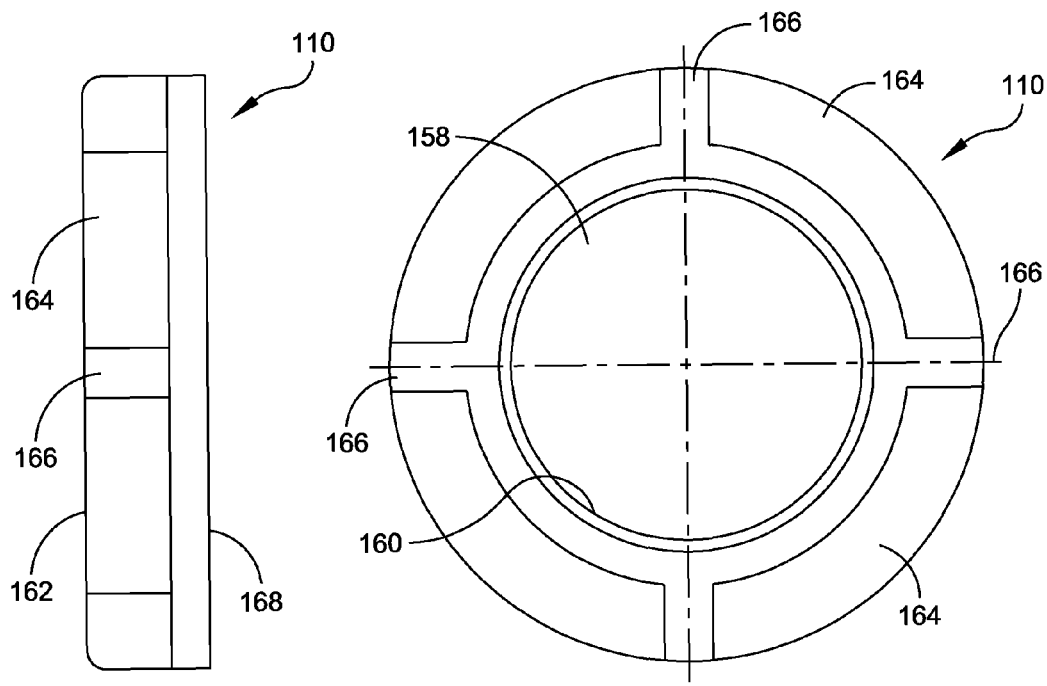
FIG. 15 is a side view of one example of a retaining nut in accordance with improved horizontal pit mounting assembly illustrated in FIG. 1.
FIG. 16 is a bottom side view of the retaining nut illustrated in FIG. 15.
Figure 17:
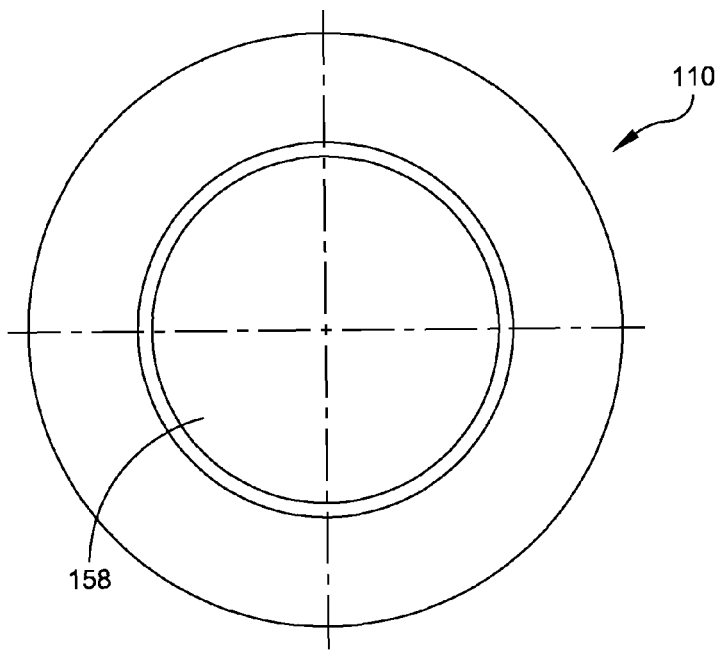
FIG. 17 is a top side view of the retaining nut illustrated in FIG. 15.

Retaining nut 110 illustrated in FIGS. 15-17 may be fabricated from a polymer or plastic material including, but not limited to, polypropylene, polyethylene, or the like. As shown in FIGS. 16 and 17, nut 110 may define a central aperture 158 having internal threads 160 or other engagement structure including, but not limited to, a plurality of annular grooves. A bottom surface 162 of the nut 110 may include a plurality of undercut sections 164 to provide a plurality of gripping surfaces 166 as best seen in FIG. 16. The undercut sections 164 and gripping surfaces 166 may be radially arranged on the bottom surface 162 around the central aperture 158 of the nut 110. The top surface 168 of nut 110 may be smooth or it may include a raised or roughened surface to provide increased friction.

Figure 18:
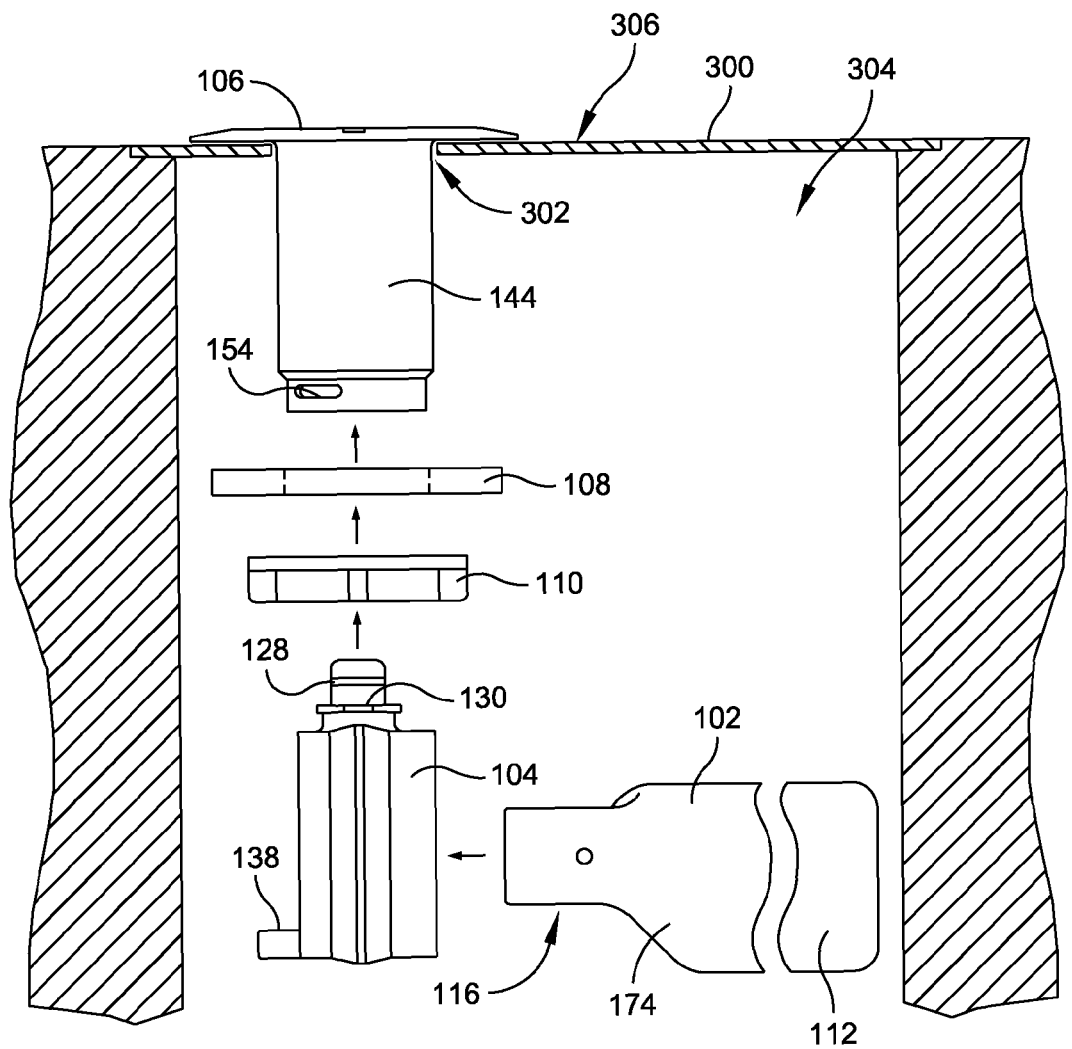
FIG. 18 is an exploded assembly view of the improved horizontal pit mounting assembly being installed in a pit.

One example of assembling the horizontal pit mounting assembly 100 is illustrated in FIG. 18. To assemble, the elongate stem 144 of the mounting body 106 is placed within a hole 302 of a pit cover 300 that covers a pit 304 such that the bottom surface 170 of the head 148 of the mounting body 106 is disposed against a top surface 306 of the pit cover 300. The spacer 108 is then slid over the elongate stem 144 of the mounting body 106, and the nut 110 is screwed onto the stem 144 to secure the elongate mounting body 106 to the pit cover 300.

With the mounting body 106 secured to the pit cover 300, support channel 104 may be coupled to the elongate stem 144 of mounting body 106. To couple the support channel 104 to the mounting body 106, pressure is applied to the protrusions 130, e.g., by squeezing the protrusions 130, which compresses the upper portion 118 of the support channel 104. The upper portion 118 of the support channel 104 may be compressed until the ledges 128 may be received within the opening 152 defined by mounting body 106. The arms 124 are moved into the opening 152 of the mounting body 106 until the ledges 128 are aligned with the slots 154 defined by the elongate stem 144 of the mounting body 106. The pressure on the protrusions 130 may be released resulting in the ledges 128 being received in the slots 154.

The AMR unit 102 may then be slid neck 116 first into the open space 172 defined by the support channel 104. The AMR unit 102 is slid into the open space 172 (FIGS. 4 and 5) until the shoulder 174 of the AMR unit 102 contacts the inwardly extending flanges 134 of the support channel 104 and the stop 138 is received within hole or recess 114 of the AMR unit 102. Additionally, ridge 136 of the support channel 104 may engage a raised surface 176 (FIG. 2) of the body 112 of the AMR unit 102.

The AMR unit 102 may be coupled to a utility meter, such as a water or gas meter, by wires (not shown). In operation, the AMR unit 102 receives signals from the utility meter, which it then uses to determine the amount of the commodity, e.g., water, gas, or the like, being used as measured by the meter. The AMR unit 102 then transmits a radio frequency (RF) signal from its internal antenna (not shown). The transmitted RF signal is directed up the central chamber 150 of the elongate stem 144 of mounting body 106, which acts like a chimney to direct the RF signal out of the pit.

The assembly 100 provides enhanced transmission of an RF signal transmitted by an AMR unit 102 by aligning the antenna of the AMR unit with a transmission passageway defined by the elongate mounting portion, while at the same time advantageously reducing the likelihood of the AMR 102 from being exposed to moisture on the floor of a utility pit.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A mounting assembly for an automatic meter reading (AMR) unit, comprising:
    a body having a head and an elongate stem extending from a bottom surface of the head, the elongate stem sized and configured to be received in and extend through a hole formed in a cover of a pit, the head having a size greater than a size of the hole formed in the cover of the pit;
    a nut defining a central aperture sized and configured to receive the elongate stem of the body, the nut for coupling the body to pit cover; and
    a support channel having a pair of spaced apart arms each including a ledge configured to be received in a slot formed in the elongate stem of the body, the support channel defining an opening that is sized and configured to receive at least a portion of the AMR unit therein.

2. The mounting assembly of claim 1, wherein the support channel includes at least one flange extending into the opening.

3. The mounting assembly of claim 1, wherein the support channel includes a projection extending into the opening for engaging a hole defined by a body of an AMR device.

4. The mounting assembly of claim 1, wherein the elongate stem includes a plurality of threads disposed on an external surface thereof.

5. The mounting assembly of claim 4, wherein the nut includes a plurality of threads disposed on an internal surface of the aperture for engaging the threads disposed on the external surface of the elongate stem.

6. The mounting assembly of claim 1, further comprising a spacer defining a central aperture having a diameter sufficient to slidably receive the elongate stem.

7. The mounting assembly of claim 1, wherein the support channel includes a pair of spaced apart side walls coupled together by a bottom wall having a bowed shape.

8. The mounting assembly of claim 7, wherein the support channel includes a pair of inwardly extending top walls extending from the spaced apart side walls, the pair of spaced apart arms extending in a substantially perpendicular direction from the pair of inwardly extending top walls.

9. A mounting assembly, comprising:
    a mounting body including a head and an elongate stem extending from a bottom surface of the head, the elongate stem having an outer diameter that is less than an outer diameter of the head;
    a locking nut defining a central aperture sized and configured to receive the elongate stem of the body; and
    a support channel including a bottom wall, a pair of side walls extending from the bottom wall, a pair of top walls inwardly extending from the side walls, and a pair spaced apart arms extending from the top walls, each of the spaced apart arms including a ledge configured to be received in a slot defined by the elongate stem of the mounting body, the support channel defining an opening that is sized and configured to receive at least a portion of an AMR unit therein.

10. The mounting assembly of claim 9, wherein the support channel includes at least one protrusion extending from one of the pair of spaced apart arms, the at least one protrusion disposed adjacent to the ledge on the arm.

11. The mounting assembly of claim 9, wherein one of the side walls includes an inwardly projection flange.

12. The mounting assembly of claim 9, wherein the bottom surface of the support channel has a bowed shape.

13. The mounting assembly of claim 9, wherein the bottom wall of the support channel includes a stop extending into the opening for engaging a hole defined by a body of an AMR device.

14. The mounting assembly of claim 9, wherein the elongate stem includes a plurality of threads disposed on an external surface thereof.

15. The mounting assembly of claim 14, wherein the locking nut includes a plurality of threads disposed on an internal surface of the aperture for engaging the threads disposed on the external surface of the elongate stem.

16. A method, comprising:
    inserting an elongate stem of a mounting body through a hole defined by a cover of a utility pit, the mounting body including a head having a diameter that is greater than a diameter of the elongate stem;
    advancing a locking nut along the elongate stem of the mounting body to secure the mounting body to the cover of the utility pit;
    compressing a pair of arms of a support channel, the support channel including a bottom wall, a pair of side walls extending from the bottom wall, a pair of top walls inwardly extending from the side walls, and the pair spaced apart arms extending from the top walls; and
    releasing the pair of arms of the support channel such that at least one ledge extending from one of the pair of arms is received in a slot defined by the elongate stem of the mounting body.

17. The method of claim 16, further comprising inserting a neck of an automated meter reading (AMR) device into an opening defined by the support channel until a shoulder of the AMR device contacts an inwardly projecting flange of the support channel.

18. The method of claim 16, further comprising inserting a neck of an automated meter reading (AMR) device into an opening defined by the support channel until a hole defined by the AMR device receives a stop that inwardly projects from the support channel.

19. The method of claim 16, further comprising sliding a spacer over the elongate stem of the mounting body prior to advancing the locking nut.

20. The method of claim 16, wherein each arm includes a ledge sized and configured to be received in one of a pair of diametrically opposed slots defined by the elongate stem of the mounting body.

* * * * *